US012664486B2

(12) United States Patent
Hwang et al.

(10) Patent No.: US 12,664,486 B2
(45) Date of Patent: Jun. 23, 2026

(54) METHOD, APPARATUS, AND SYSTEM FOR CALCULATING OPTIMAL PATH ON BASIS OF NODE REDUCTION

(71) Applicant: DAIM RESEARCH CO., LTD., Daejeon (KR)

(72) Inventors: Ilhoe Hwang, Seoul (KR); Seol Hwang, Seoul (KR)

(73) Assignee: DAIM RESEARCH CO., LTD., Daejeon (KR)

( * ) Notice: Subject to any disclaimer, the term of this patent is extended or adjusted under 35 U.S.C. 154(b) by 0 days.

(21) Appl. No.: 18/866,505

(22) PCT Filed: Sep. 14, 2023

(86) PCT No.: PCT/KR2023/013769
§ 371 (c)(1),
(2) Date: Nov. 15, 2024

(87) PCT Pub. No.: WO2024/063435
PCT Pub. Date: Mar. 28, 2024

(65) Prior Publication Data
US 2025/0335835 A1     Oct. 30, 2025

(30) Foreign Application Priority Data
Sep. 21, 2022     (KR) ........................ 10-2022-0119636

(51) Int. Cl.
*G06Q 10/047*     (2023.01)
(52) U.S. Cl.
CPC ................................ *G06Q 10/047* (2013.01)

(58) Field of Classification Search
CPC .................... G06Q 20/00–425; H04L 9/00–50
See application file for complete search history.

(56) References Cited

U.S. PATENT DOCUMENTS

| | | |
|---|---|---|
| 10,248,120 B1 | 4/2019 | Siegel et al. |
| 2012/0106794 A1 | 5/2012 | Iwasaki et al. |
| 2013/0231862 A1* | 9/2013 | Delling .............. G01C 21/3484 |
| | | 701/527 |

(Continued)

FOREIGN PATENT DOCUMENTS

| | | |
|---|---|---|
| JP | 11-249738 A | 9/1999 |
| JP | 2002-139331 A | 5/2002 |

(Continued)

OTHER PUBLICATIONS

Intentional Search Report for PCT/KR2023/013769 by Korean Intellectual Property Office dated Dec. 20, 2023.

(Continued)

*Primary Examiner* — Ari Shahabi
(74) *Attorney, Agent, or Firm* — BROADVIEW IP LAW, PC

(57)     ABSTRACT

The present invention relates to a method, an apparatus, and a system for calculating an optimal path on the basis of node reduction and, more specifically, to a method, an apparatus, and a system for calculating an optimal path on the basis of node reduction, in which an optimal path from a departure node to a destination node can be effectively calculated on the basis of a graph including multiple nodes corresponding to a task space in a logistics automation system.

8 Claims, 11 Drawing Sheets

(56)                References Cited

U.S. PATENT DOCUMENTS

2016/0182355 A1 *   6/2016  Traxler ................. H04L 45/122
                                                                    370/359
2017/0370738 A1    12/2017  Park et al.
2018/0343190 A1 *  11/2018  Hao ........................ H04L 45/50
2019/0004537 A1     1/2019  Haegermarck et al.

FOREIGN PATENT DOCUMENTS

JP          2002-303531  A     10/2002
JP           2009-53849  A      3/2009
JP          2011-137803  A      7/2011
JP          2011-202974  A     10/2011
JP          2012-526311  A     10/2012
JP             6879478  B2      6/2021
KR      10-2015-0062834  A      6/2015
WO         2022/097169  A1      5/2022

OTHER PUBLICATIONS

1 Notice of Allowance for KR 10-2022-0119636 by Korean Intel-
lectual property Office dated Dec. 23, 2024.
Office Action for JP 2024-568556 by Japan Patent Office dated Nov.
11, 2025.

* cited by examiner

10

NODE INFORMATION MANAGED BY LOGISTICS AUTOMATION SYSTEM

LOGICAL NODE INFORMATION REQUIRED TO CALCULATE SHORTEST PATH

CONVENTIONAL NODE/LINK STRUCTURE

LINK TABLE

| NODE A | NODE B | DISTANCE |
|--------|--------|----------|
| 1 | 2 | 1 |
| 2 | 3 | 1 |
| 3 | 4 | 1 |
| 3 | 5 | 1 |
| ... | | |

CALCULATION OF REPRESENTATIVE NODE AND OFFSET

○ REPRESENTATIVE NODE

REPRESENTATIVE NODE TABLE

| REPRESENTATIVE NODE A | REPRESENTATIVE NODE B | DISTANCE |
|-----------------------|-----------------------|----------|
| 3 | 8 | 4 |
| 3 | 20 | 3 |
| 8 | 24 | 3 |
| 20 | 24 | 4 |
| ... | | |

OFFSET TABLE

| NODE | REPRESENTATIVE NODE | OFFSET |
|------|---------------------|--------|
| 3 | 3 | 0 |
| 4 | 3 | 1 |
| 5 | 3 | 2 |
| 6 | 3 | 3 |
| ... | | |

CALCULATION OF REPRESENTATIVE NODE AND OFFSET

Fig. 7B

REPRESENTATIVE NODE TABLE

| REPRESENTATIVE NODE A | REPRESENTATIVE NODE B | DISTANCE |
|---|---|---|
| 3 | 8 | 4 |
| 3 | 20 | 3 |
| 8 | 24 | 3 |
| 20 | 24 | 4 |
| ... | | |

OFFSET TABLE

| NODE | REPRESENTATIVE NODE | OFFSET |
|---|---|---|
| 3 | 3 | 0 |
| 4 | 3 | 1 |
| 5 | 3 | 2 |
| 6 | 3 | 3 |
| ... | | |

Fig. 8A

Standard

All
Node&Link (a)

Single Pair
Cost (b)

All Pair
Cost

METHOD, APPARATUS, AND SYSTEM FOR CALCULATING OPTIMAL PATH ON BASIS OF NODE REDUCTION

CROSS-REFERENCE TO RELATED APPLICATIONS

This application is a National Phase Entry Application of PCT Application No. PCT/KR2023/013769 filed on Sep. 14, 2023, which claims priority to Korean Patent Application No. 10-2022-0119636 filed on Sep. 21, 2022, in the Korean Intellectual Property Office, the entire contents of which are hereby incorporated by reference in its entirety.

TECHNICAL FIELD

The disclosure relates to an optimal path calculation method, an optimal path calculation apparatus, and an optimal path calculation system based on node reduction and, more particularly, to an optimal path calculation method, an optimal path calculation apparatus, and an optimal path calculation system based on node reduction for effectively calculating an optimal path from an origin node to a destination node based on a graph including a plurality of nodes corresponding a task space in a logistics automation system.

BACKGROUND ART

With the growth of e-commerce and the spread of factory automation in recent years, a logistics automation system that efficiently processes the transportation of goods while minimizing the intervention of workers is being widely utilized.

In a specific example, various attempts are being made to automate logistics, improve task efficiency, and thus reduce costs by transporting products or parts using a logistics robot, such as an automated guided vehicle (AGV) or an autonomous mobile robot, in a warehouse or factory or transporting wafers using an overhead hoist transport (OHT) in a semiconductor factory.

More specifically, it is known that an Amazon Kiva system illustrated in FIG. 1 operates more than 200,000 automated guided vehicles (AGVs) 10 in warehouses around the world, thereby reducing logistics costs by 20% and reducing logistics transport time to ⅙.

In major decision-making, the logistics automation system may derive and use the shortest path from an origin node to a destination node and cost information therefor for path search or task assignment for a logistics robot.

To this end, as illustrated in FIGS. 2A and 2B, a conventional logistics automation system may generally express the entire task pace as a graph including nodes and edges, and calculate the shortest path or cost information by using Dijkstra's algorithm or the A* algorithm.

However, in the above conventional art, as the number of nodes increases, the execution time of the algorithms exponentially increases.

Accordingly, as illustrated in FIG. 3, when applying Dijkstra's algorithm to a logistics system in a task space 200 including a large number of nodes, it takes an excessively long time for computation to increase the load of a server, which may cause an increase in control request-response time between the server and a logistics robot and a decrease in operation efficiency of the logistics system.

DISCLOSURE OF INVENTION

Technical Problem

The present disclosure has been made in view of the foregoing problems of the conventional art, and an aspect of the present disclosure is to provide an optimal path calculation method, an optimal path calculation apparatus, and an optimal path calculation system based on node reduction for effectively reducing computation time required to detect the shortest path based on a graph including a plurality nodes corresponding to a task space in a logistics automation system.

Further, an aspect of the present disclosure is to provide an optimal path calculation method, an optimal path calculation apparatus, and an optimal path calculation system based on node reduction for effectively reducing the computation load of a server, thus implementing a quick control request-response between the server and a logistics robot and enabling stable system operation.

Other specific aspects of the disclosure will be clearly identified and understood by an expert or a researcher in this technical field through the detailed content to be described below.

Solution to Problem

To achieve the foregoing aspects, a method for calculating an optimal path from a first node to a second node, based on a graph including a plurality of nodes and an edge connecting the plurality of nodes corresponding to a task space according to an embodiment of the disclosure includes: a representative node calculation operation of calculating, by an optimal path calculation system, a first representative node corresponding to the first node and a second representative node corresponding to the second node from a plurality of representative nodes including a node connected to three or more edges among the plurality of the nodes; a representative node optimal path calculation operation of calculating a representative node optimal path from the first representative node to the second representative node; and an optimal path calculation operation of calculating an optimal path from the first node to the second node in consideration of the representative node optimal path, the distance difference (offset) between the first representative node and the first node, and the distance difference (offset) between the second representative node and the second node.

The representative node calculation operation may include calculating a representative node closest to the plurality of nodes as a representative node for each node.

The representative node calculation operation may include calculating the first representative node and the second representative node by using a first table including information about the correspondence relationship between the plurality of nodes and the representative nodes.

The representative node optimal path calculation operation may include calculating the representative node optimal path by using a second table including information about the distance between the representative nodes.

The representative node optimal path calculation operation may include calculating the representative node optimal path by applying Dijkstra's algorithm or A* algorithm, based on the second table.

The optimal path calculation operation may include calculating the optimal path from the first node to the second node by using the representative node optimal path and a first table including information about the correspondence relationship between the plurality of nodes and the representative nodes and the distance difference (offset) therebetween.

The method may further include a representative node graph configuration operation of configuring a representative node graph including information about the plurality of representative nodes including the node connected to the three or more edges among the plurality of the nodes in the graph.

The representative node graph may be configured including information about a plurality of representative edges connecting the plurality of representative nodes.

A system for calculating an optimal path from a first node to a second node, based on a graph including a plurality of nodes and an edge connecting the plurality of nodes corresponding to a task space according to another embodiment of the disclosure includes: a representative node calculation unit configured to calculate a first representative node corresponding to the first node and a second representative node corresponding to the second node from a plurality of representative nodes including a node connected to three or more edges among the plurality of the nodes; a representative node optimal path calculation unit configured to calculate a representative node optimal path from the first representative node to the second representative node; and an optimal path calculation unit configured to calculate an optimal path from the first node to the second node in consideration of the representative node optimal path, the distance difference (offset) between the first representative node and the first node, and the distance difference (offset) between the second representative node and the second node.

Advantageous Effects of Invention

Accordingly, an optimal path calculation method, an optimal path calculation apparatus, and an optimal path calculation system according to an embodiment of the disclosure may effectively reduce computation time required to detect the shortest path based on a graph including a plurality of nodes corresponding to a task space in a logistics automation system.

Further, the optimal path calculation method, the optimal path calculation apparatus, and the optimal path calculation system according to the embodiment of the disclosure may reduce the computation load of a server, thus implementing a quick control request-response between the server and a logistics robot and enabling stable system operation.

Effects obtainable from the disclosure are not limited to the effects mentioned above, and other effects not mentioned will be clearly understood by those skilled in the art from the following description of the disclosure.

BRIEF DESCRIPTION OF DRAWINGS

The accompanying drawings, which are included as a part of the detailed description to help the understanding of the present disclosure, provide embodiments of the present disclosure and describe the technical spirit of the present disclosure in conjunction with the detailed description, in which:

FIGS. 5A, 5B, 6A, 6B, 7A and 7B illustrate an optimal path calculation method according to an embodiment of the disclosure;

FIGS. 8A and 8B illustrate a comparative example of an optimal path calculation method according to an embodiment of the disclosure.

BEST MODE FOR CARRYING OUT THE INVENTION

The disclosure may be variously modified and may include various embodiments. Hereinafter, specific embodiments will be described in detail with reference to the accompanying drawings.

The following embodiments are provided for a comprehensive understanding of methods, apparatuses, and/or systems described herein. However, these embodiments are merely for illustration, and the disclosure is not limited thereto.

When detailed descriptions of known technologies related to the disclosure are determined to make the gist of the disclosure unclear in describing embodiments of the disclosure, the detailed descriptions will be omitted herein. Further, terms used below are defined in consideration of functions in the disclosure and may thus be changed depending on a user, the intent of an operator or a custom. Accordingly, the terms should be defined on the basis of the following overall description of this specification. The terminology used in the detailed description is for describing embodiments of the disclosure only and is not intended to limit the present disclosure. Unless clearly used otherwise, singular forms are intended to include plural forms. It will be understood that the expression "include" or "comprise", when used in this description, specify the presence of stated features, integers, steps, operations, elements, or some or combinations thereof, but do not preclude the presence or addition of one or more other features, integers, steps, operations, elements, or some or combinations thereof.

Although the terms "first", "second", and the like may be used to describe various components, these components should not be limited by these terms. These terms are used only to distinguish one component from another component.

Hereinafter, illustrative embodiments of an optimal path calculation method, an optimal path calculation apparatus, and an optimal path calculation system based on node reduction according to an embodiment will be sequentially described with reference to the accompanying drawings.

Figure 1:
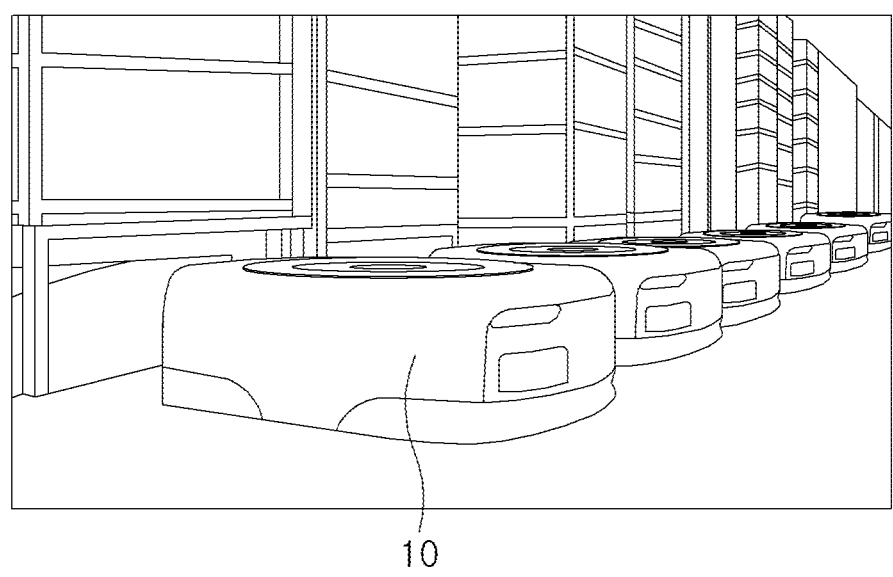
FIG. 1 illustrates an Amazon Kiva system according to a conventional art.
Figure 2A:
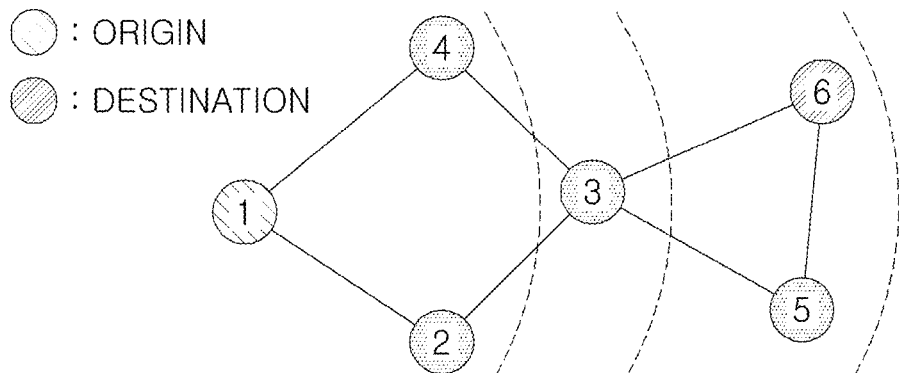
FIGS. 2A and 2B illustrate Dijkstra's algorithm according to a conventional art.
Figure 2B:
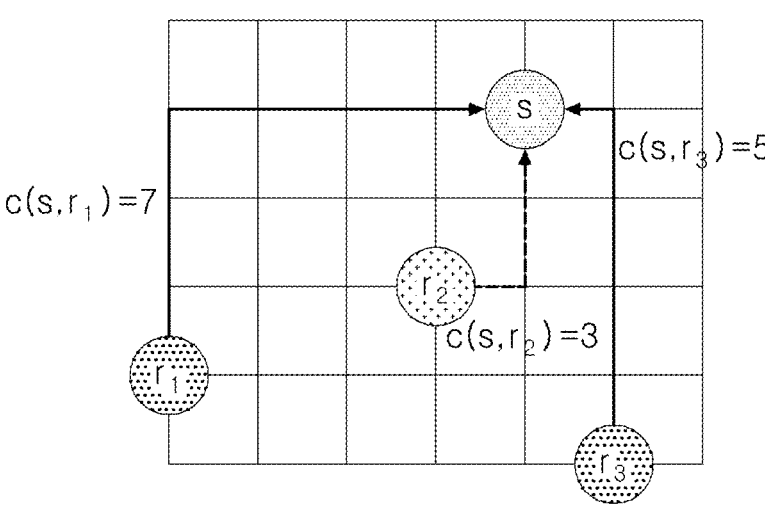

As illustrated in FIGS. 2A and 2B, a conventional logistics automation system performs path search and task assignment for a logistics robot, based on a graph including a plurality of nodes and an edge connecting the plurality of nodes corresponding to a task space.

In a specific example, the logistics automation system may calculate the shortest path from an origin node (e.g., node 1 of FIG. 2A) to a destination node (e.g., node 6 of FIG. 2A) and costs by applying Dijkstra's algorithm or A* algorithm, based on the graph including the plurality of nodes and the edge corresponding to the task space as illustrated in FIG. 2A, or may select a logistics robot (e.g., $r_2$ of FIG. 2B) located at the shortest distance among a plurality of robots and assign the logistics robot a task to perform as illustrated in FIG. 2B.

More specifically, Dijkstra's algorithm is a representative algorithm for finding the shortest path, and finds the shortest path between two nodes in a graph-shaped task space as illustrated in FIG. 2A.

However, the time complexity of Dijkstra's algorithm is $O(|V|^2)$, and thus computation time increases exponentially as the number of nodes increases.

In addition, as illustrated in FIG. 2B, when operating the logistics automation system, task assignment and movement commands are given to logistics robots, based on Dijkstra's algorithm.

For task assignment, a logistics robot closest to the location of goods may be selected using Dijkstra's algorithm.

Specifically, in FIG. 2B, when the value of the shortest path from node a to node b is c(a,b), a task may be assigned to the logistics robot $r_2$ (i.e., $c(s,r_2)$=3 in FIG. 2B) having a shortest path value closest to the location s of goods.

However, when applying Dijkstra's algorithm or the like to the conventional logistics system as described above, the execution time of the algorithm increases exponentially according to the number of nodes, which may increase the computation time and increase the computation load of a server.

Specifically, in the conventional art, it takes an excessively long time for computation in the actual logistics system in the task space 200 including a large number of nodes to increase the load of the server, which may cause an increase in control request-response time between the server and a logistics robot and a decrease in operation efficiency.

For example, in a case of a large-scale logistics automation system with approximately 9,000 nodes, a considerable computation load may be required to calculate the shortest movement path for a single logistics robot, and a computation time of several seconds or more may be taken when considering N logistics robots.

Furthermore, a computation time of several seconds or more may be required whenever a task is assigned, causing a significant decrease in overall operation efficiency of the logistics automation system.

An optimal path calculation method, an optimal path calculation apparatus, and an optimal path calculation system based on node reduction according to an embodiment of the disclosure may reduce the total number of nodes by performing stratification of converting a conventional graph including a plurality of nodes and an edge into a representative node graph so that high-relevance information may be identified and used for decision-making, may considerably reduce computation time by calculating a path based on the total number of nodes, and may implement a quick control request-response between a server and a logistics robot and enable stable system operation by reducing the computation load of the server or the like in an actual industry field.

Furthermore, the node reduction-based optimal path calculation method, apparatus, and system according to the embodiment of the disclosure may be applied to various logistics automation systems having a graph structure, thus having a greater impact.

Figure 3:
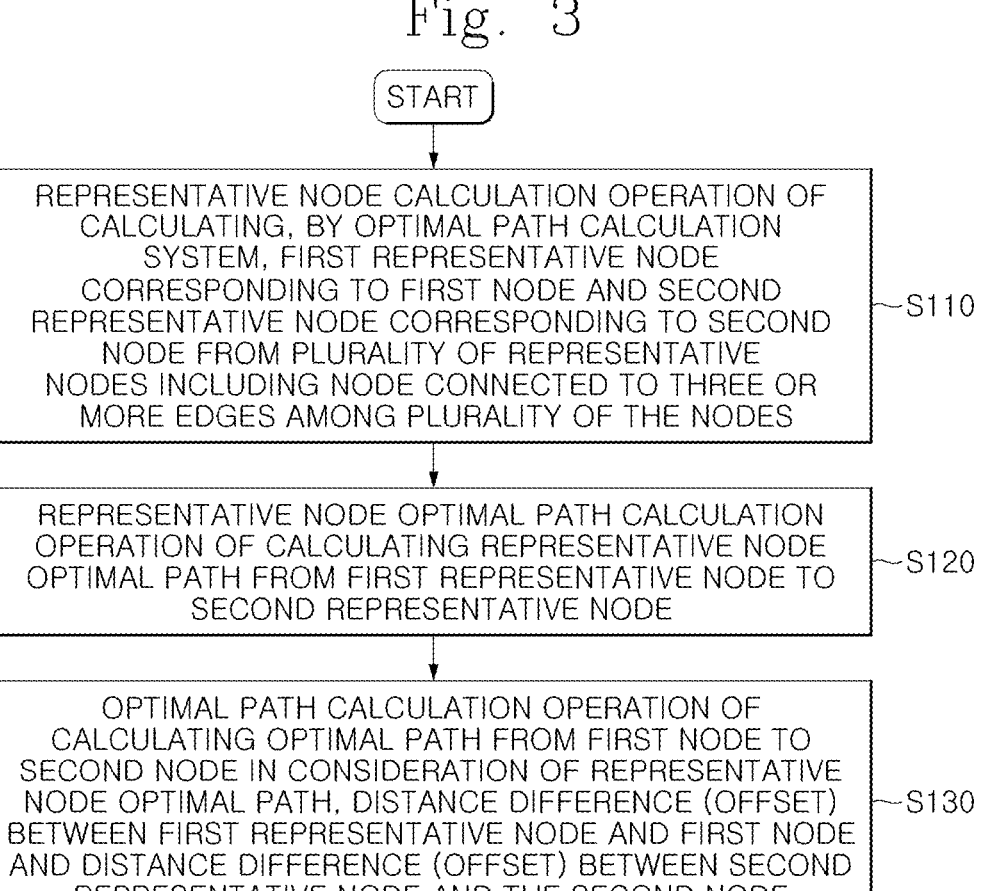
FIG. 3 is a flowchart illustrating an optimal path calculation method according to an embodiment of the disclosure.

FIG. 3 is a flowchart illustrating an optimal path calculation method according to an embodiment of the disclosure.

As illustrated in FIG. 3, the optimal path calculation method according to the embodiment of the disclosure is a method for calculating an optimal path from a first node to a second node, based on a graph including a plurality of nodes and an edge connecting the plurality of nodes corresponding to a task space 200, which includes a representative node calculation operation S110 of calculating, by an optimal path calculation system 120, a first representative node corresponding to the first node and a second representative node corresponding to the second node from a plurality of representative nodes including a node connected to three or more edges among the plurality of the nodes, a representative node optimal path calculation operation S120 of calculating a representative node optimal path from the first representative node to the second representative node, and an optimal path calculation operation S130 of calculating an optimal path from the first node to the second node in consideration of the representative node optimal path, the distance difference (offset) between the first representative node and the first node, and the distance difference (offset) between the second representative node and the second node.

In the representative node calculation operation S110, a representative node closest to the plurality of nodes may be calculated as a representative node for each node.

In the representative node calculation operation S110, the first representative node and the second representative node may be calculated using a first table including information about the correspondence relationship between the plurality of nodes and the representative nodes.

In the representative node optimal path calculation operation S120, the representative node optimal path may be calculated using a second table including information about the distance between the representative nodes.

In the representative node optimal path calculation operation S120, the representative node optimal path may be calculated by applying Dijkstra's algorithm or A* algorithm based on the second table.

In the optimal path calculation operation S130, the optimal path from the first node to the second node may be calculated using a first table including information about the correspondence relationship between the plurality of nodes and the representative nodes and the distance difference (offset) therebetween.

In the optimal path calculation operation S130, the shortest path from the first node to the second node may be calculated using the representative node optimal path and the first table.

The method may further include a representative node graph configuration operation (not shown) of configuring a representative node graph including information about the plurality of representative nodes including the node connected to the three or more edges among the plurality of the nodes.

The representative node graph may be configured including information about a plurality of representative edges connecting the plurality of representative nodes.

Accordingly, an optimal path calculation method, an optimal path calculation apparatus, and an optimal path calculation system according to an embodiment of the disclosure may effectively reduce computation time required to detect the shortest path based on a graph including a plurality nodes corresponding to a task space in a logistics automation system, and may reduce the computation load of a server, thus implementing a quick control request-response between the server and a logistics robot and enabling stable system operation.

Figure 4:
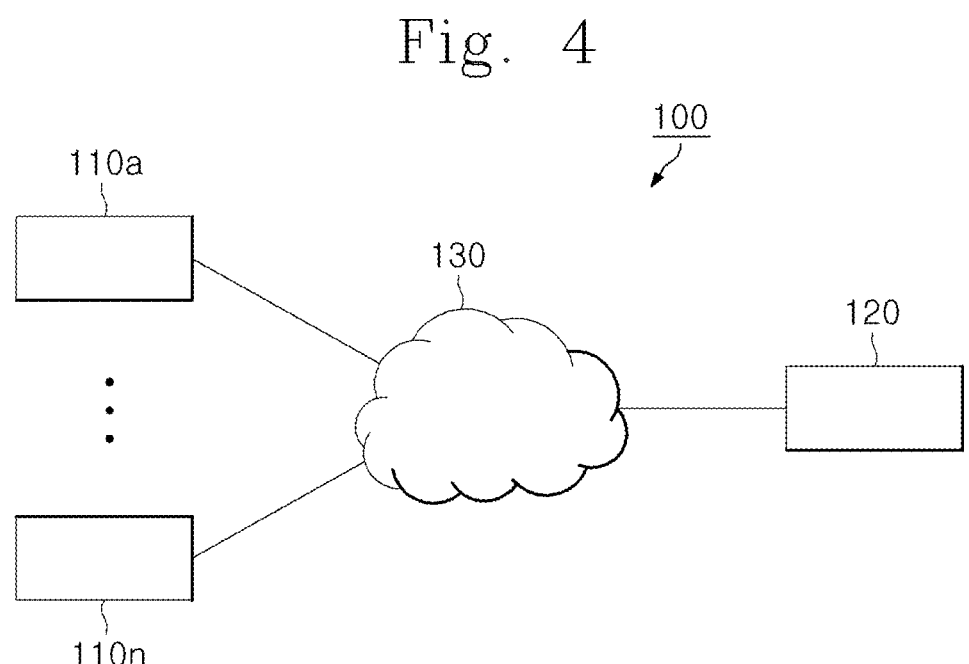
FIG. 4 illustrates the configuration of a logistics automation system according to an embodiment of the disclosure.

FIG. 4 illustrates the configuration of a logistics automation system 100 to which an optimal path calculation method is applied according to an embodiment of the disclosure.

As illustrated in FIG. 4, the logistics automation system 100 according to the embodiment of the disclosure may include a logistics robot 110, 110a, . . . , and 110n, such as a plurality of automated guided vehicles (AGVs), an optimal path calculation system 120 including a server and calculating an optimal path for the logistics robot, and a communication network 130 connecting the logistics robot 110 and the optimal path calculation system 120.

Accordingly, the logistics robot 110 may be provided with information about an optimal path in a task space 200 from the optimal path calculation system 120 to move or perform a task.

Specifically, the disclosure calculates an optimal path for a logistics robot, and the logistics robot may include an automated guided vehicle (AGV) or an autonomous mobile robot (AMR) that performs a task while moving along a predetermined path, an overhead hoist transport (OHT) used in a semiconductor factory, or the like, but the disclosure is not limited thereto and may also include various devices that perform a task, such as logistics, while moving along a predetermined path.

Although the following description is made mainly with reference to an automated guided vehicle (AGV), which is only for illustration, the disclosure is not limited thereto and may also be applied to various devices depending on applied applications.

The logistics robot 110 may move or perform a task according to the information about the optimal path transmitted from the optimal path calculation system 120 including the server or the like, but the disclosure is not necessarily limited thereto. The logistics robot 110 may be configured to operate by various methods, such as moving or performing a task, based on data calculated through additional computation based on the information transmitted from the optimal path calculation system 120.

The optimal path calculation system 120 may be configured using a server or the like, but the disclosure is not necessarily limited thereto. The optimal path calculation system 120 may not be configured as a separate device but be combined with one or more logistics robots 110 in an integrated manner depending on an operation environment.

The communication network 130 connecting the logistics robot 110 and the optimal path calculation system 120 may include a wired network and a wireless network, and may include specifically various communication networks, such as a local area network (LAN), a metropolitan area network (MAN), and a wide area network (WAN). In addition, the communication network (130) may include the known World Wide Web (WWW). However, the communication network 130 according to the disclosure is not limited to the networks listed above, and may include a known wireless data network or known wired and wireless networks.

Hereinafter, the optimal path calculation method, the optimal path calculation apparatus, and the optimal path calculation system according to the embodiment of the disclosure will be described by each component in detail with reference to FIG. 3 and FIG. 4.

In the optimal path calculation method according to the embodiment of the disclosure, the logistics automation system 100 may calculate an optimal path from a first node, which is an origin node, to a second node, which is a destination node, based on a graph including a plurality of nodes and an edge connecting the plurality of nodes corresponding to the task space 200.

To this end, first, in the representative node calculation operation S110, the optimal path calculation system 120 calculates a first representative node corresponding to the first node and a second representative node corresponding to the second node from a plurality of representative nodes including a node connected to three or more edges among the plurality of the nodes.

In the representative node calculation operation S110, a representative node closest to the plurality of nodes may be calculated as a representative node for each node.

In the representative node calculation operation S110, the first representative node and the second representative node may be calculated using a first table including information about the correspondence relationship between the plurality of nodes and the representative nodes.

In the representative node optimal path calculation operation S120, the representative node optimal path may be calculated using a second table including information about the distance between the representative nodes.

In the representative node optimal path calculation operation S120, the representative node optimal path may be calculated by applying Dijkstra's algorithm or A* algorithm based on the second table, but the disclosure is not necessarily limited thereto.

In addition, the optimal path calculation method according to the embodiment of the disclosure may further include a representative node graph configuration operation (not shown) of configuring a representative node graph including information about the plurality of representative nodes including the node connected to the three or more edges among the plurality of the nodes in the graph.

The representative node graph may be configured including information about a plurality of representative edges connecting the plurality of representative nodes.

Figures 5A, 5B:
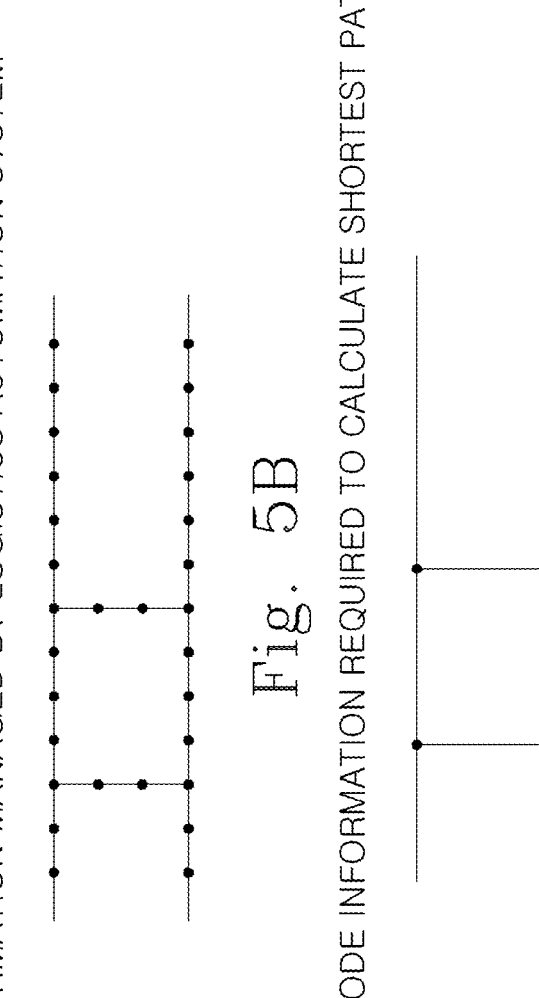

Specifically, as illustrated in FIG. 5A, a conventional logistics automation system 100 generally generates and manages nodes at regular intervals even not in a diverging/converging point for reasons of operation and management of a logistics robot 110.

However, when Dijkstra's algorithm or the like is applied, nodes that are not located in the diverging/converging point may cause unnecessary calculations and significantly increase computation resources and computation time required.

As illustrated in FIG. 5B, the optimal path calculation method, the optimal path calculation apparatus, and the optimal path calculation system according to the embodiment of the disclosure may selectively use a representative node, which is a logical node, based on a diverging/converging point, rather than all nodes, thereby effectively reducing computation resources and operation time required to calculate an optimal path.

Figures 6A, 6B:
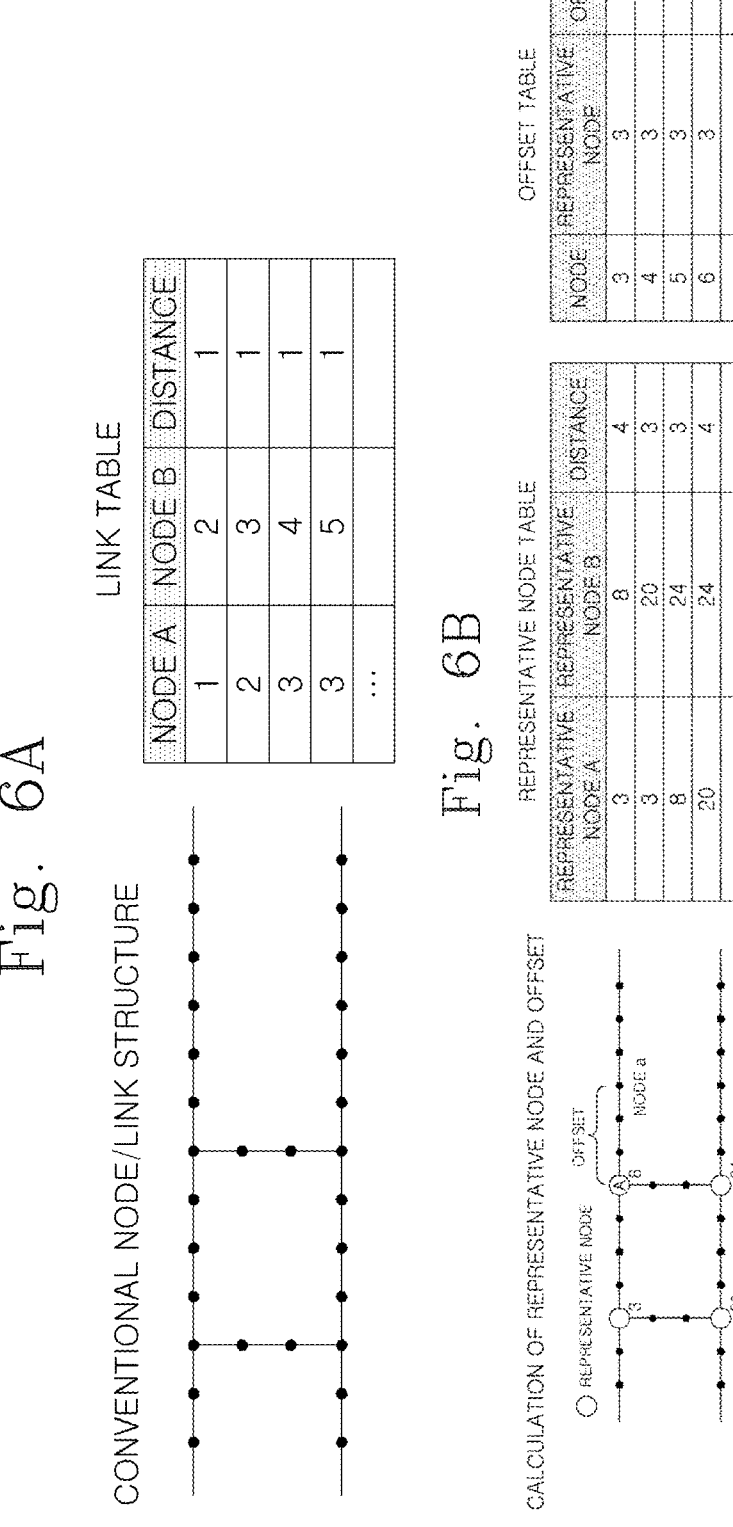

More specifically, as illustrated in FIG. 6A, the conventional logistics automation system 100 generally uses a plurality of nodes at regular intervals even not in a diverging/converging point, and generates and uses a link table including information about the plurality of nodes and information about the connection relationship between the nodes.

However, as illustrated in FIG. 6B, the optimal path calculation method, the optimal path calculation apparatus, and the optimal path calculation system according to the embodiment of the disclosure may generate a representative node table (=second table) including information about each representative node and an offset table (=first table) including information about the corresponding relationship between a plurality of nodes and the representative node and the distance difference (offset) therebetween, based on a graph including the plurality of nodes and a plurality of edges for the task space 200.

That is, as illustrated in FIG. 6B, all nodes in the task space 200 may be expressed with information about a representative node of the nodes and the distance difference (offset) from the representative node, and accordingly the relationship between each node and a corresponding representative node may be configured in the offset table (=first table).

Accordingly, in the optimal path calculation operation S130, the optimal path from the first node to the second node is calculated in consideration of the representative node optimal path, and the distance difference (offset) between the first representative node and the first node and the distance difference (offset) between the second representative node and the second node obtained from the offset table (=first table).

The first table may include the information about the corresponding relationship between the plurality of nodes and the representative node and the distance difference (offset) therebetween, and accordingly the optimal path from the first node to the second node may be calculated using the first table, and the shortest path from the first node to the second node may be further calculated using the representative node optimal path calculated in the representative node optimal path calculation operation S120 and the first table.

Figure 7A:
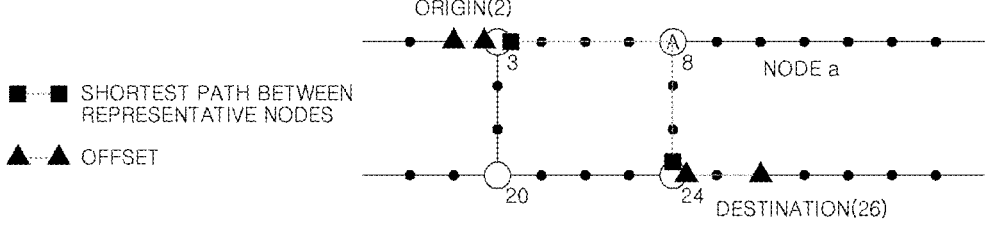

More specifically, in FIG. 7A, to calculate the shortest path from a specific first node to a second node, such as from an origin node (origin in FIG. 7A) to a destination node (destination in FIG. 7A), (1) representative nodes for the first node and the second node are identified first.

To this end, the representative nodes for the first node and the second node may be calculated using an offset table (=first table).

Specifically, in a case of calculating the shortest path from node 2 (origin) to node 26 (destination) in FIG. 7A, node 3 and node 24 may be calculated as representative nodes for node 2 and node 26 by using the offset table (=first table) in FIG. 7B.

Next, (2) an optimal path from the first node to the second node may be calculated by applying Dijkstra's algorithm or the like, based on a representative node table (=second table).

Specifically, as illustrated in FIG. 7A, an optimal path (=representative node optimal path) between the representative nodes, which are node 3 and node 24, may be calculated by applying Dijkstra's algorithm, based on the representative node table in FIG. 7B.

Accordingly, (3) an optimal path value from the first node to the second node may be calculated in consideration of the calculated representative node optimal path and offset values for the first node and the second node.

Specifically, as illustrated in FIG. 7A, a shortest path value from node 2 to node 26 may be calculated by adding an offset value from node 2 to node 3, a shortest path value from node 3 to node 24, and an offset value from node 24 to node 26.

Accordingly, an optimal path calculation method, an optimal path calculation apparatus, and an optimal path calculation system according to an embodiment of the disclosure may effectively reduce computation time required to detect the shortest path based on a graph including a plurality nodes corresponding to a task space in a logistics automation system, and may reduce the computation load of a server, thus implementing a quick control request-response between the server and a logistics robot and enabling stable system operation.

MODE FOR CARRYING OUT THE INVENTION

Specifically, a case of applying the optimal path calculation method, the optimal path calculation apparatus, and the optimal path calculation system according to the embodiment of the disclosure to an automated guided vehicle (AGV)-based logistics automation system including 9,088 nodes and 11,183 edges is illustrated below as an experimental example of the disclosure.

Figure 8A:
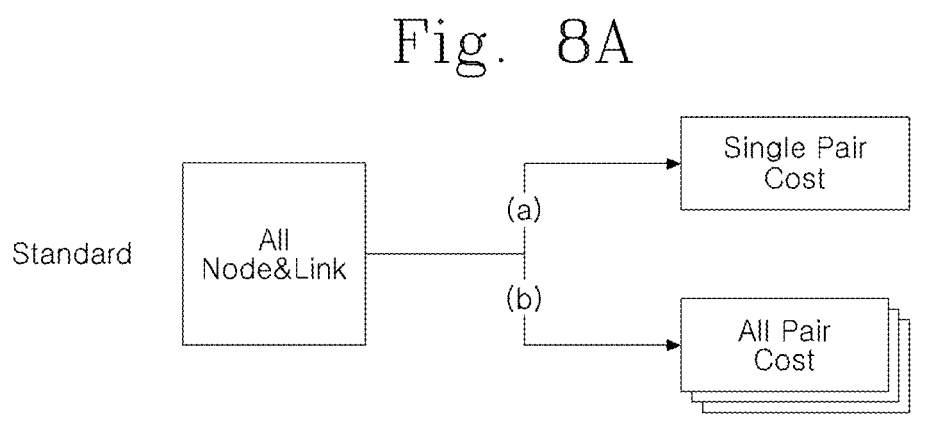
Figure 8B:
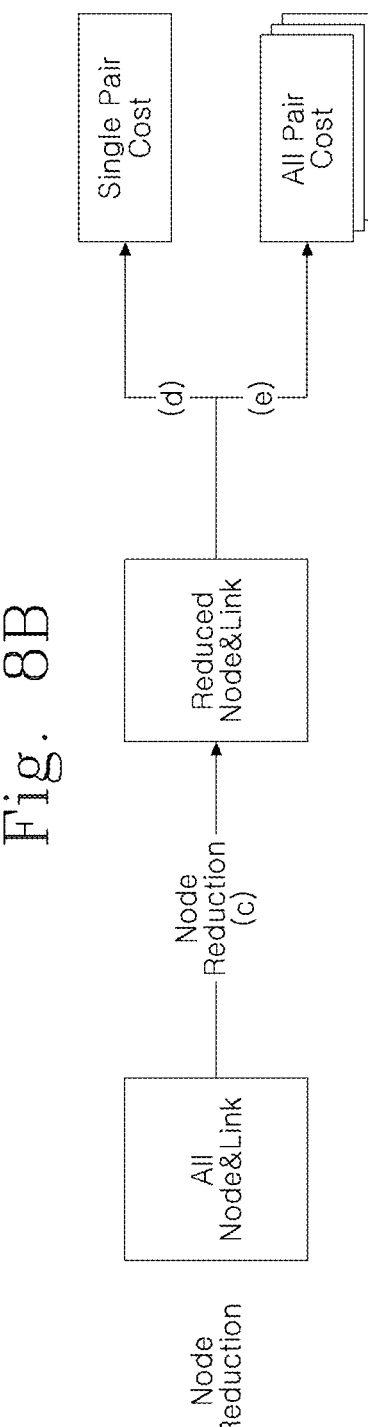

First, time required to calculate the shortest path between a specific first node and a specific second node by directly applying Dijkstra's algorithm to a graph including the 9,088 nodes and the 11,183 edges was calculated to be 17.095 ms on average ((i) Single Pair Cost of FIG. 8A), whereas an average of 0.001 ms ((iv) Single Pair Cost of FIG. 8B) was required in the optimal path calculation method, the optimal path calculation apparatus, and the optimal path calculation system according to the embodiment of the disclosure, identifying that it is possible to calculate the shortest path for a single node pair in a very short time that is 0.006% of the time in the conventional art.

Further, in the above experimental example, a total of 8104.1 seconds were required to calculate the shortest paths between a total of 9088 nodes by directly applying Dijkstra's algorithm to the graph including the 9088 nodes and the 11183 edges ((ii) All Pair Cost of FIG. 8A, approximately 135 minutes), whereas a total of 214.5 seconds were required in the optimal path calculation method, the optimal path calculation apparatus, and the optimal path calculation system according to the embodiment of the disclosure ((v) All Pair Cost of FIG. 8B, approximately 3.56 minutes), identifying that it is possible to calculate the shortest paths for all nodes in a short time that is 2.647% of that in the conventional art.

The optimal path calculation method, the optimal path calculation apparatus, and the optimal path calculation system according to the embodiment of the disclosure may configure in advance a representative node table including a plurality of representative nodes including a node connected to three or more edges (i.e., a node at a diverging/converging point) among a plurality of nodes in the graph including all nodes and edges.

To this end, in the above experimental example, a process of identifying a representative node and edge highly relevant to decision-making among all nodes and edges is required with respect to the graph including the 9,088 nodes and the 11,183 edges in total, and thus time required for this process was measured separately, identifying that 39.1 seconds were required to calculate 1,855 representative nodes (FIG. 8B (iii)).

Although it is possible to calculate the shortest path for each node pair by applying Dijkstra's algorithm or the like to all nodes according to the conventional art (Single Pair), when dozens to hundreds of shortest paths need to be simultaneously calculated, the complex logistics automation system 100 including a large number of nodes may have excessive system load to cause a considerable delay in calculation time, and when the shortest paths for all nodes are calculated at a time, it may take a considerable amount of time of up to several hours, making it difficult to apply the conventional art in an actual field (All Pair).

In the optimal path calculation method, the optimal path calculation apparatus, and the optimal path calculation system according to the embodiment of the disclosure, when a representative node is calculated in advance for just dozens of seconds at an initial operation time, the shortest path for each node pair may be calculated within a very short time, thereby enabling a large-scale logistics automation system 100 to be efficiently operated.

Figure 9:
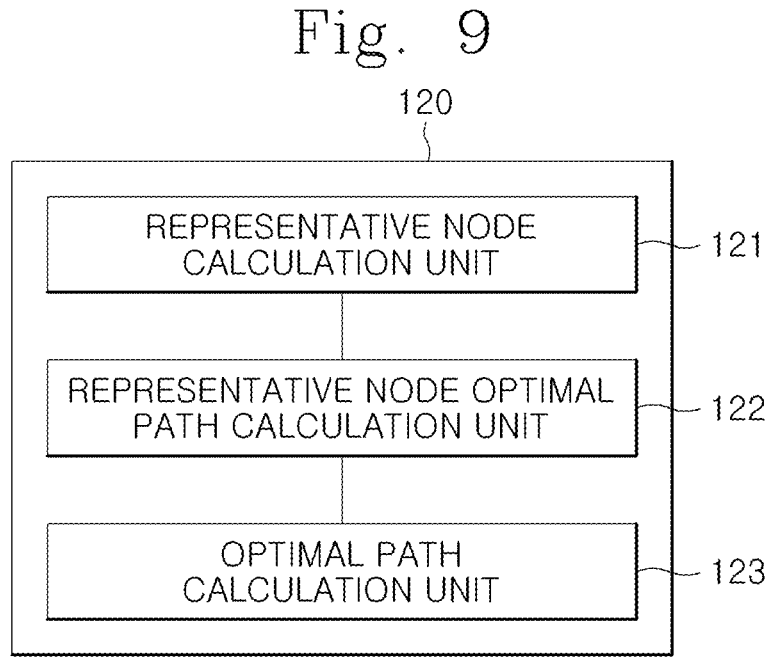
FIG. 9 illustrates the configuration of an optimal path calculation system according to an embodiment of the disclosure.

FIG. 9 illustrates the configuration of an optimal path calculation system 120 according to an embodiment of the disclosure.

As illustrated in FIG. 9, the optimal path calculation system 120 according to the embodiment of the disclosure is an optimal path calculation system 120 that calculates an optimal path from a first node to a second node, based on a graph including a plurality of nodes and an edge connecting the plurality of nodes corresponding to a task space 200, and may include a representative node calculation unit 121, a representative node optimal path calculation unit 122, and an optimal path calculation unit 123.

A detailed description of the optimal path calculation system 120 according to the embodiment of the disclosure may be inferred from the foregoing description of the optimal path calculation method according to the embodiment of the disclosure made with reference to FIG. 1 to FIG. 8B, and thus the following description focuses on core components and a more detailed description will be omitted.

In the optimal path calculation system 120 according to the embodiment of the disclosure, the representative node calculation unit 121 calculates a first representative node corresponding to the first node and a second representative node corresponding to the second node from a plurality of representative nodes including a node connected to three or more edges among the plurality of the nodes.

The representative node optimal path calculation unit 122 calculates a representative node optimal path from the first representative node to the second representative node.

The optimal path calculation unit 123 calculates an optimal path from the first node to the second node in consideration of the representative node optimal path, the distance difference (offset) between the first representative node and the first node, and the distance difference (offset) between the second representative node and the second node.

Accordingly, an optimal path calculation method, an optimal path calculation apparatus, and an optimal path calculation system according to an embodiment of the disclosure may effectively reduce computation time required to detect the shortest path based on a graph including a plurality of nodes corresponding to a task space in a logistics automation system.

Further, the optimal path calculation method, the optimal path calculation apparatus, and the optimal path calculation system according to the embodiment of the disclosure may reduce the computation load of a server, thus implementing a quick control request-response between the server and a logistics robot and enabling stable system operation.

The foregoing description is provided merely to explain the technical idea of the present disclosure, and it will be apparent to those having ordinary skill in the art to which this disclosure belongs that various modifications and variations can be made in the disclosure without departing from the essential characteristics of the disclosure. The embodiments disclosed herein are provided not to limit but to describe the technical idea of the present disclosure and do not limit the scope of the present disclosure. The scope of the present disclosure should be construed as being defined by the appended claims, and any technical ideas within the appended claims and their equivalents should be construed as being included in the scope of the disclosure.

The invention claimed is:

1. A method for calculating an optimal path for a logistics robot from a first node to a second node to move the logistics robot in a task space, based on a graph comprising a plurality of nodes and an edge connecting the plurality of nodes corresponding to the task space, the method comprising:

a representative node graph configuration operation of configuring, by a server to control the logistics robot, a representative node graph comprising information about a plurality of representative nodes comprising a node connected to three or more edges among the plurality of representative nodes in the graph;

a representative node calculation operation of calculating a first representative node corresponding to the first node and a second representative node corresponding to the second node from the plurality of representative nodes;

a representative node optimal path calculation operation of calculating a representative node optimal path from the first representative node to the second representative node based on the representative node graph; and an optimal path calculation operation of calculating an optimal path for the logistics robot from the first node to the second node including the representative node optimal path, the distance difference (offset) between the first representative node and the first node, and the distance difference (offset) between the second representative node and the second node, wherein the logistics robot moves or performs a task in the task space based on the calculating the optimal path.

2. The method of claim 1, wherein the representative node calculation operation comprises calculating a representative node closest to the plurality of nodes as a representative node for each node.

3. The method of claim 2, wherein the representative node calculation operation comprises calculating the first representative node and the second representative node by using a first table comprising information about the correspondence relationship between the plurality of nodes and the representative nodes.

4. The method of claim 1, wherein the representative node optimal path calculation operation comprises calculating the representative node optimal path by using a second table comprising information about the distance between the representative nodes.

5. The method of claim 4, wherein the representative node optimal path calculation operation comprises calculating the representative node optimal path by applying Dijkstra's algorithm or A* algorithm, based on the second table.

6. The method of claim 1, wherein the optimal path calculation operation comprises calculating the optimal path from the first node to the second node by using a first table comprising information about the correspondence relationship between the plurality of nodes and the representative nodes and the distance difference (offset) therebetween.

7. The method of claim 6, wherein the optimal path calculation operation comprises calculating the shortest path from the first node to the second node may be calculated using the representative node optimal path and the first table.

8. The method of claim 1, wherein the representative node graph is configured comprising information about a plurality of representative edges connecting the plurality of representative nodes.

\* \* \* \* \*